Figure 1:
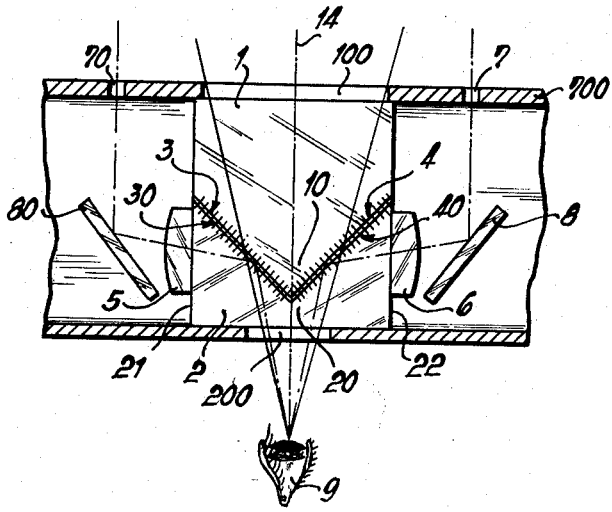

March 31, 1964    F. PAPKE    3,127,463
PHOTOGRAPHIC VIEWFINDER WITH DIVIDED FIELD
FRAME AND IMAGING MEANS
Filed Oct. 31, 1961    2 Sheets-Sheet 1

INVENTOR
Friedrich Papke

Blum, Moscovitz, Friedman & Blum
Attorneys

United States Patent Office 3,127,463
Patented Mar. 31, 1964

3,127,463
PHOTOGRAPHIC VIEWFINDER WITH DIVIDED
FIELD FRAME AND IMAGING MEANS
Friedrich Papke, Braunschweig, Germany, assignor to Voigtlander A.G., Braunschweig, Germany, a corporation of Germany
Filed Oct. 31, 1961, Ser. No. 149,003
Claims priority, application Germany Nov. 15, 1960
6 Claims. (Cl. 88—2.4)

This invention relates to photographic viewfinders having image limiting or defining frames in the field of view thereof and, more particularly, to a novel and improved compact viewfinder of this type.

With increased miniaturization of cameras, and with the addition thereto of various automatic mechanisms, the available space within the camera casing is at a premium. Consequently, it is important that all functional parts of the camera be designed to be as compact as possible in order not to require excessive space for mounting within the camera casing, hood, or the like.

The present invention is directed to a novel viewfinder which occupies a minimum of space not only when designed as a viewfinder per se but also when designed as a combined viewfinder and range finder, sometimes known as a "measuring finder." To achieve this effect, in the invention viewfinder two partly light permeable mirrors are provided which are disposed at an angle to each other and effect the imaging of the image field limiting or defining frame. This frame comprises two parts or sections which are disposed outside of the direct light ray path through the finder and in such a manner that the images thereof are combined to form an image of a complete frame as viewed in the viewfinder. The light rays providing the images of the frame parts are directed to the partially light-permeable mirror of the finder proper by means of deflecting mirrors disposed in the path of such light rays.

More particularly, the body of the finder proper preferably comprises two prismatic parts of transparent material which are combined to form a block shape parallelepiped. The part of this block facing the object is formed with a roof shaped projection or salient on its end toward the eye to constitute a male or positive roof prism, while the other part of the finder body is formed with a corresponding roof shaped angular recess mating with the salient and thus constituting a female or negative roof prism. The two parts are cemented together at the resultant interface to form a composite body of transparent material, and the partially light permeable mirrors are disposed in such interface.

The mirrors for reflecting the frame imaging light rays to the partially light-permeable mirrors are arranged substantially parallel to the respective angularly related parts of the interface. Between each reflecting mirror and its associated part of the interface, a lens is cemented to the finder body and is so designed as to focus the frame imaging light rays at substantially infinity. The two parts of the interface are preferably disposed at right angles to each other, although the angle therebetween can be increased to approximately 120 degrees, while the "peak" of the "roof" is preferably at the optical axis of the finder.

The frame to be imaged can be designed in the form of breaks or openings in the camera hood wherein the viewfinder is to be mounted. Alternatively, a transparent plate can be mounted on the objective end of the finder, this plate having a sufficient lateral extent that frame defining marks thereon are positioned outside or laterally of the finder body. In this case, the frame defining marks are designed as opaque or substantially opaque masks on the transparent plate.

The two reflecting mirrors may be fixedly secured to the finder body, so that it is thus possible to design the entire finder as a unit which, after assembly and integration, needs only to be fitted into the camera hood and properly aligned.

Viewfinders embodying the invention also can be designed as measuring or range finders, as well as to provide an image of the position of indicating means, such as the indicator of an exposure meter or the like, located outside the viewfinder. To design the viewfinder as a range finder, it is necessary to provide, in addition to the parts already described, a mirror pivotally mounted to one side of the finder body for directing the measuring light rays into the finder, and to provide a window or opening in the camera hood for the measuring light rays to reach this pivoted mirror.

To provide further an indication of the position of indicating means, a fixed mirror is mounted adjacent the opposite side of the finder body and has a length such that it is not only in the path of the frame imaging light rays but also in the path of light rays for imaging the position of the indicating means. When the viewfinder thus is designed to provide an image of the position of indicating means or the like, the roof portion of the object facing prism or body part is asymmetrical with respect to the optical axis of the viewfinder, so that the partially light-permeable mirror to which the range measuring light rays are directed by the pivotally mounted mirror is longer than the other partially light-permeable mirror which faces the fixed reflecting mirror. Of course, a light entry window or opening must be provided in the hood on that side of the viewfinder where the indicating means is located in order to permit entry of light for imaging the indicating means.

Figure 2:
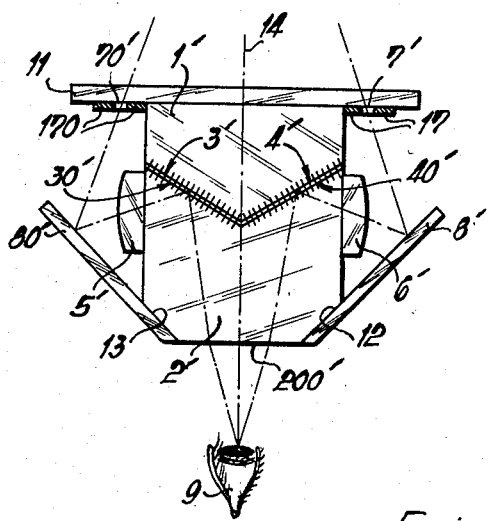
Figure 3:
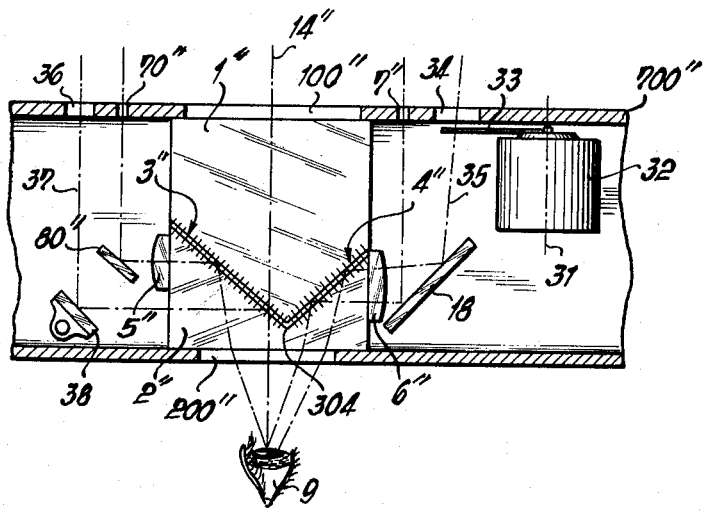

For an understanding of the principles of the invention, reference is made to the following description of typical embodiments thereof as illustrated in the accompanying drawings. In the drawings:

FIG. 1 is a horizontal sectional view of a camera hood having one form of viewfinder embodying the invention mounted therein, the partially light-permeable mirrors of the viewfinder being arranged at substantially 90 degrees to each other;

FIG. 2 is a plan view, partly in section, of a unitary form of viewfinder embodying the invention, the partially light-permeable mirrors extending at an angle of about 120 degrees to each other; and FIG. 3 is a view, similar to FIG. 1, illustrating the viewfinder embodying the invention as modified for use as a range finder and to provide an image of the position of indicating means disposed laterally of the viewfinder.

Referring to FIG. 1, the basic construction of a viewfinder embodying the invention includes a two part body of glass or other transparent material, this body including a body part 1 facing the object and a body part 2 facing the eye 9. Body part 1 is formed with a "roof" or V shape salient 10 facing the eye, and this salient 10 mates with a corresponding V-shaped recess in the object facing end of the body part 2. The angularly related surfaces 3 and 4 of the salient 10 are cemented to the angularly related surfaces 30 and 40 of the V-shaped notch 20 in the part 2 by means of transparent optical cement. The two parts 1 and 2 are thus joined together and, in combination, form a plano-parallel parallelepiped block or body of transparent material, such as glass. Surfaces 3 and 4 are a pair of roof surfaces which, with block 1, form a roof prism 10 which is positive or male. Similarly, surfaces 30 and 40 are roof surfaces which, with block 2, form a roof prism which is negative or female.

The light entry opening or "objective lens" of the viewfinder is indicated at 100 as formed within the camera hood 700, and the viewing opening 200, or "eye-piece" of the viewfinder, is also formed as an opening in the camera hood 700. The optical axis of the viewfinder is indicated at 14 as intersecting the peak or vertex of the interface between the parts 1 and 2. The partially light-permeable mirrors may be formed either on the surfaces 3 and 4 or on the surfaces 30 and 40, and may be referred to generally as disposed in the angularly related interfaces between the respective surfaces 3 and 4 and the respective surfaces 30 and 40.

The means, outside the viewfinder proper or the body 1—2, for forming the frame comprises, in the embodiment illustrated in FIG. 1, openings or slots 7 and 70 in the hood 700. These openings or slots 7 and 70 are generally U-shaped in a plane perpendicular to that of the drawing, the U-shaped slots having their open sides facing each other and being so related that, when viewed through the viewfinder, they provide an image of a border substantially fully defining an open frame constituting the image defining frame. Preferably, the frame image thus formed is substantially rectangular.

In the particular embodiment illustrated in FIG. 1, the partially light-permeable mirrors are arranged at an angle of 90 degrees to each other. Lenses 5 and 6 are disposed upstream of the light rays impinging on the partially light-permeable mirrors, and these lenses are preferably cemented to the lateral surfaces of the viewfinder body block, preferably to the lateral surfaces 21 and 22 of the part 2 of the body block. The lens 5, on the left hand side of the viewfinder as viewed in FIG. 1, serves to focus the light rays imaging the frame part 70 at substantially infinity, as viewed by the eye 9 of a photographer or other observer looking through the viewfinder. This imaging light ray is reflected by the oblique mirror 80 disposed laterally of the body block of the viewfinder. Similarly, the lens 6 focuses at substantially infinity the light rays entering through the frame defining opening 7 and reflected through the lens 6 by the reflecting mirror 8 disposed obliquely laterally of the viewfinder.

As the openings 7 and 70 are symmetrical with respect to the optical axis 14 of the viewfinder, the light rays entering therethrough are directed in such a manner that there are provided two images, each comprising one-half of the frame. As viewed in the viewfinder, this forms a complete and preferably closed frame defining border to appear in the image field.

The arrangement shown in FIG. 1 has the advantage that the focusing lenses 5 and 6 can be mounted much closer to the eye, and can be reduced in dimensions, as compared to known frame defining means hitherto used in viewfinders and where the entire imaging of the frame is directed from one side or end of the viewfinder. Furthermore, the arrangement results in less disruptive aberrations than if the lenses were larger. The space requirement for the viewfinder is greatly reduced due to the fact that both parts of the frame imaging means can be placed around but outside the finder objective. It should be noted that the reflecting mirrors 8 and 80 are disposed substantially parallel to the associated partially light-permeable mirrors.

In the embodiment of FIG. 2, parts corresponding to equivalent parts in FIG. 1 have been given the same reference characters primed. In this embodiment, the parts providing the image of the frame are illustrated at 7' and 70', here illustrated as formed in masks 17 and 170 mounted on a transparent plate 11 of glass or other suitable transparent material. Plate 11 has a lateral extent considerably greater than that of the finder body 1', so that the frame imaging parts 7' and 70' are located outside and laterally of the body 1'. As in the case of FIG. 1, the transparent body of the finder comprises an objective facing body part 1' and an eye facing body part 2' integrally united by transparent optical cement. The objective lens of the viewfinder is constituted by the transparent plate 11, and the ocular or eye-piece is constituted by the surface 200' of the body part 2'.

In the same manner as in FIG. 1, the partially light-permeable mirrors are disposed at the interfaces between the surfaces 3' and 4', of the body part 1', and the surfaces 30' and 40' of the body part 2', these surfaces being cemented together by a suitable transparent optical cement and the partially light-permeable mirrors being provided either on the surfaces of the body part 1' or on the surfaces of the body part 2'. Also as in FIG. 1, the focusing lenses 5' and 6' are cemented on lateral surfaces of the body part 2' and in the path of light rays entering through the frame defining openings 7' and 70' and reflected by the mirrors 8' and 80' to the partially light-permeable mirrors. The lenses 5' and 6' again focus the frame defining parts at substantially infinity as viewed by the eye 9 of an observer.

In the embodiment of the invention shown in FIG. 2, the eye end of the body part 2' is formed with bevelled surfaces 12 and 13, and the mirrors 8' and 80' are cemented to these bevelled surfaces by means of a transparent optical cement. The mirrors 8' and 80', as well as the transparent plate 11 carrying the masking frame and the focusing lenses 5' and 6', are thus all assembled into a single unit which may be pre-assembled before mounting into the camera and alignment therein.

It will be noted that the partially light-permeable mirrors, in the embodiment of FIG. 2, extend relative to each other at an angle greater than 90 degrees, and which may be as great as 120 degrees. Since it is a somewhat difficult matter to polish a recessed surface, as would be necessary in the embodiment of both FIGS. 1 and 2 with respect to the recess of the body part 2 or 2', the faces 30' and 40' of the body part 2' which are intended to be cemented to the surfaces 3' and 4' of the body part 1' may be left in a rough or unfinished state, and the transparent optical cement will have the same index of refraction as that of the material of the body 2'. Of course, the same procedure may be used with the embodiment shown in FIG. 1. In the arrangement shown in FIG. 2, all of the parts of the viewfinder are symmetrical with respect to the optical axis 14', in the same manner as in the embodiment shown in FIG. 1.

FIG. 3 illustrates the principles of the invention as embodied in a viewfinder which is further operative not only as a range finder or measuring finder, but also to provide an image, in the field of view of the viewfinder, of the position or indication of indicating means located outside the camera. In this embodiment of the invention, parts corresponding to those of FIGS. 1 and 2 have been given the same reference characters double primed.

As in the embodiments of FIGS. 1 and 2, the viewfinder comprises a body of transparent material including an object facing body part 1" and an eye facing body part 2", the eye facing end of body part 1" being formed with the angularly related surfaces 3" and 4" so that its is essentially in the form of an angular salient or "roof." Similarly, the body part 2" is formed with a V-shaped recess mating with the surfaces 3" and 4" and cemented thereto by a transparent optical cement, the partially light-permeable mirrors being disposed in the resulting cemented interfaces and on either one or the other of the facing surfaces of such interface. However, it will be noted that the edge or peak 304 of the V-shaped interface is, in the embodiment of FIG. 3, asymmetrical with respect to the optical axis 14" of the viewfinder so that the surface 3" is substantially longer than the surface 4". In the same manner as in FIG. 1, the two parts of the frame are formed by the image defining apertures 7" and 70" in the wall of the camera hood 700", and the frame imaging light rays are reflected by mirrors 18 and 80" through the focusing lenses 5" and 6" to the partially light-permeable mirrors for providing an image of the frame at substantially infinity as viewed by the eye 9 of an observer. As in the previous embodiments, the lenses 5"

and 6" are cemented to lateral surfaces of the eye facing body part 2".

However, it should be noted that one reflecting mirror 80" is substantially smaller than the other reflecting mirror 18, or vice versa. The smaller mirror 80" is disposed laterally of the viewfinder body toward the side from which the measuring light rays enter the viewfinder. These measuring light rays, as indicated at 37, enter through an opening or window 36 in the hood 700" and are reflected to the partially light-permeable mirror by a pivotally mounted or angularly adjustable mirror 38.

In the usual manner the angularly adjustable mirror 38 may be adjusted to bring about coincidence of the direct image and the measuring image, and thus provide a measure of the distance. It will be noted that mirrors 80" and 38 are so disposed that they provide separate paths for the respective light rays to the partially permeable mirror, and that furthermore the ray 37 strikes the associated partially light permeable mirror at the intersection of the latter with the optical axis 14" of the viewfinder. In addition to providing adjustability of the ray 37 by the angularly adjustable mirror 38, other deflection means of the type commonly employed and familiar in the construction of photographic range finders may be used.

To the right of the viewfinder body, and close to the frame image defining aperture 7", a further window or opening 34 is formed in the camera hood 700" for entry of the light ray 35 which is reflected by the mirror 18 through the lens 6" to the partially light-permeable mirror, and thereby reflected to the eye 9. This light ray 35 is used to provide an image of the position of indicating means located in the camera hood 700" laterally of the viewfinder body. By way of example, this indicating means is illustrated as the indicator 33 of the measuring instrument 32 of an exposure meter, this measuring instrument being disposed within the camera hood 700" and having an axis 31 which, in the case of the particular example illustrated, is in spaced parallel relation to the optical axis 14" of the viewfinder body 1"—2". The mirror 18 is made larger than the mirror 80" so that it serves to reflect both the frame image defining ray and the ray 35 for imaging the position of the indicator 33.

While specific embodiments of the invention have been shown and described in detail to illustrate the application of the principles of the invention, it will be understood that the invention may be embodied otherwise without departing from such principles.

What is claimed is:

1. An objective field defining viewfinder comprising, in combination, a housing having an object facing front wall and an eye facing rear wall; a composite parallelepiped body of transparent material having a light ray entry end at said front wall and a light ray exit end at such rear wall and through which the observer views directly a scene to be photographed, said body including an object facing first body part and an eye facing second body part; the eye facing end surface of said first body part being formed as a V-shaped salient to constitute a male roof prism, and the object facing end surface of said second body part being formed with a V-shaped recess complementary to said salient to constitute a female roof prism; said two body parts being joined at cemented interfaces between their two mating pairs of inner end surfaces; a pair of partially light-permeable mirrors each disposed in a respective one of said interfaces and facing toward the light ray exit end of said body and toward a respective lateral surface thereof; means, including openings in said front wall, forming a pair of complementary field frame defining light ray admission areas disposed symmetrically laterally of, but closely adjacent, said body at the light ray entry end thereof, and respectively adjacent opposite ones of said lateral surfaces thereof; said front wall having an opening for admitting light from the object through the light ray entry end of said body; a pair of reflecting mirrors, each positioned in direct alignment with one of said light admission areas and facing toward the associated light admission area and toward a respective one of said partially light-permeable mirrors to reflect light rays, entering through its associated light admission areas, laterally to the facing partially light-permeable mirror for reflection by the latter to the light ray exit end of said body to form images of said areas in the image field of the viewfinder; said rear wall having a single opening centered on the optical axis of said body for single eye viewing of the object and the images of both of said areas in said image field; the relative orientation of said reflecting mirrors and said partially light-permeable mirrors with respect to the optical axis of the finder being such as to convergingly shift the two frame defining images laterally toward the optical axis of the viewfinder to an extent such that said frame defining images complement each other in said image field to provide therein, in the field of view of a single eye of an observer, an image of a complete objective field defining frame; and a pair of collimating lenses positioned on respective ones of said lateral faces of said eye facing second body part and each disposed in the path of light rays reflected by a respective reflecting mirror to its associated partially light-permeable mirror, the optical constants of each of said lenses being such that the light rays passing therethrough are focused sharply at substantially infinity in the field of view of the viewfinder in association with the image of the photographic objective.

2. An objective field defining viewfinder, as claimed in claim 1, each of said reflecting mirrors being disposed laterally outside the composite transparent body and substantially parallel to its associated partially light-permeable mirror within said composite body, the prolongations of said reflecting mirrors forming a V whose apex intersects the optical axis of the finder adjacent the eye of the observer.

3. An objective field defining viewfinder, as claimed in claim 1, in which said reflecting mirrors are united with said transparent body to form a unit therewith.

4. An objective field defining viewfinder, as claimed in claim 3, in which said eye facing part of the viewfinder body is formed with a pair of bevelled surfaces adjacent the eye facing end surface thereof; said reflecting mirrors being mounted on said bevelled surfaces.

5. An objective field defining viewfinder, as claimed in claim 1, in which one of said partially light-permeable mirrors is longer than the other of said partially light-permeable mirrors, and the angle formed thereby is asymmetrical with respect to the optical axis of the viewfinder so that the intersection of said partially light-permeable mirrors is laterally of the optical axis of the viewfinder, whereby said glass block and the internal partially reflecting roof prism forming interfaces thereof may be used for observation of laterally disposed images while maintaining the compactness of the parts of the viewfinder.

6. An objective field defining viewfinder comprising, in combination, a parallelepiped body of transparent material having a light ray entry end and a light ray exit end through which the observer views directly a scene to be photographed, said body including an object facing body part and an eye facing body part; the eye facing end surface of said object facing body part being formed as a V-shaped salient, and the object facing end surface of the eye facing body part being formed with a V-shaped recess complementary to said salient; said two body parts being joined at cemented interfaces between their two mating inner end surfaces; a pair of partially light-permeable mirrors each disposed in a respective one of said interfaces and facing toward the light ray exit end of said body and toward a respective lateral surface thereof; means forming a pair of complementary field frame defining light ray admission areas disposed symmetrically laterally of, but closely adjacent, said body at the light ray entry end thereof, and respectively adjacent opposite ones of said lateral surfaces thereof; a pair of reflecting mirrors, each positioned in direct alignment with one of said light admission areas and facing toward the associated light admission area and toward a respective one of said partially light-permeable mirrors to reflect light rays, entering through its associated light admission areas, laterally to the facing partially light-permeable mirror for reflection by the latter to the light ray exit end of said body to form images of said areas in the image field of the viewfinder; the relative orientation of said reflecting mirrors and said partially light-permeable mirrors with respect to the optical axis of the finder being such as to convergingly shift the two frame defining images laterally toward the optical axis of the viewfinder to an extent such that said frame defining images complement each other in said image field to provide therein an image of a complete objective field defining frame; a pair of collimating lenses positioned on respective ones of said lateral faces of said eye facing body part and each disposed in the path of light rays reflected by a respective reflecting mirror to its associated partially light-permeable mirror, the optical constants of each of said lenses being such that the light rays passing therethrough are focused sharply at substantially infinity in the field of view of the viewfinder in association with the image of the photographic objective; one of said partially light-permeable mirrors being longer than the other of said partially light-permeable mirrors, and the angle formed thereby being asymmetrical with respect to the optical axis of the viewfinder so that the intersection of the prolongations of said partially light-permeable mirrors is laterally of the optical axis of the viewfinder; said viewfinder being constructed as a range finder including a third reflecting mirror mounted outside of said body laterally of the longer partially light-permeable mirror and rearwardly and outwardly of the adjacent first reflecting mirror and the associated collimating lens, said third reflecting mirror being adjustable about a pivot axis to reflect a distance measuring light ray, entering through an opening in said front wall into said viewfinder and intersecting the direct measuring ray on the optical axis at a point on the longer partially light-permeable mirror whereby, by adjustment of said third reflecting mirror, the image provided by the distance measuring ray and that provided by the direct measuring light rays, entering directly into the light ray entry end of said body, may be brought into coincidence by reflection of the distance measuring light ray by the longer partially light-permeable mirror along the optical axis toward the eye of an observer; said third reflecting mirror, by virtue of its location, directing the measuring light rays into the viewfinder in by-passing relation to the adjacent first reflecting mirror and its associated collimating lens correlated with the longer partially light-permeable mirror; indicating means positioned laterally outside the other side of said body and including an indicator in the path of light rays directed, through an opening in said front wall, laterally of the adjacent means forming a complementary field frame defining light ray admission area, to the other of said first reflecting mirrors for reflection by the latter through the associated collimating lens to the shorter partially light-permeable mirror; whereby light rays forming an image of the position of said indicator are reflected to the eye of a viewer to provide an image of the position of said indicator in the field of view of the viewfinder.

References Cited in the file of this patent

UNITED STATES PATENTS

| | | |
|---|---|---|
| 2,305,437 | Meyer et al. | Dec. 15, 1942 |
| 3,033,090 | Winkler | May 8, 1962 |

FOREIGN PATENTS

| | | |
|---|---|---|
| 1,009,478 | Germany | May 29, 1957 |
| 1,050,183 | Germany | Feb. 5, 1959 |